Feb. 18, 1936. E. M. HARRIS 2,030,866
CLOSED CAR WIND DEFLECTOR
Filed March 6, 1933
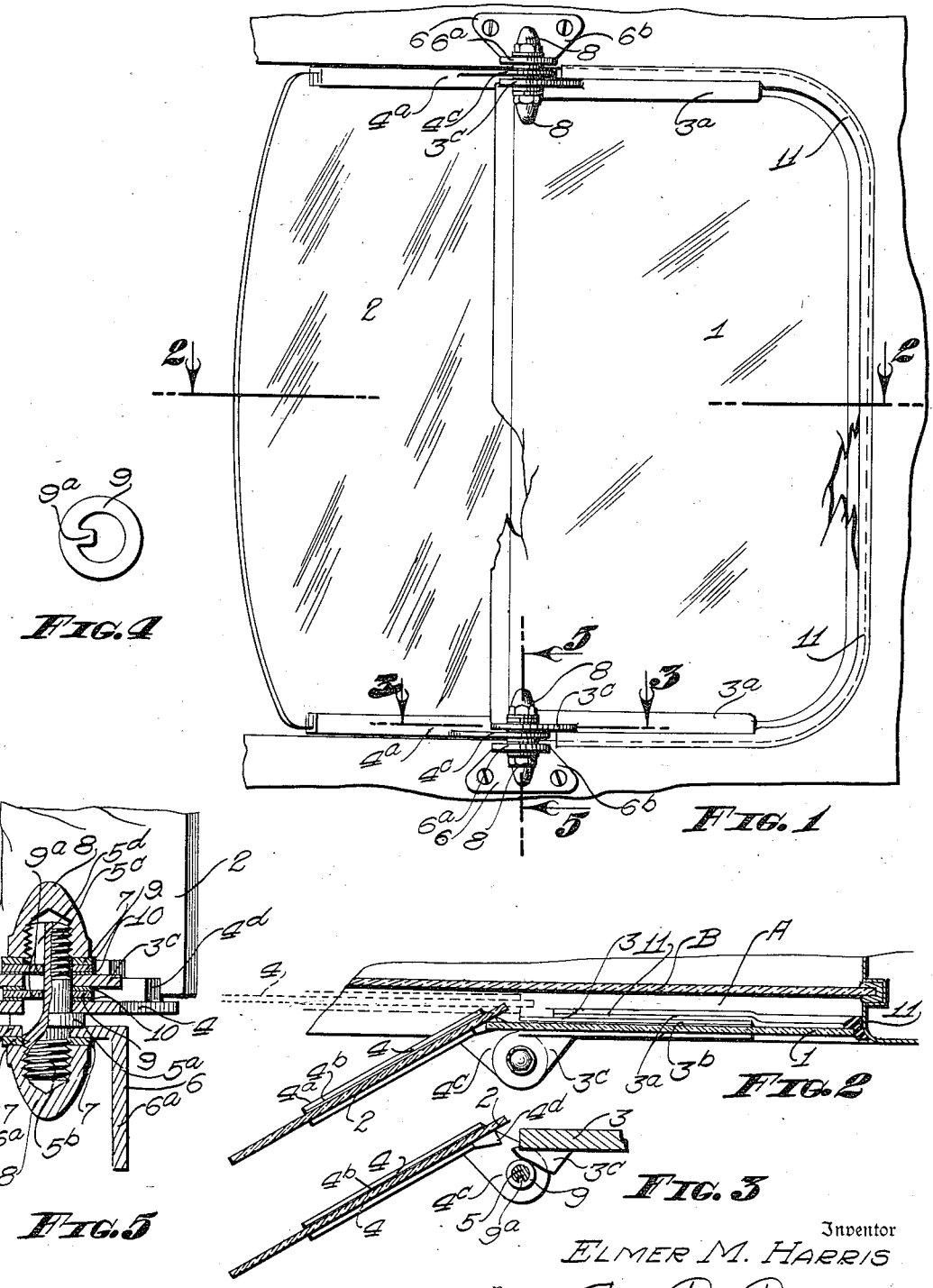
Inventor
ELMER M. HARRIS
By A. B. Bouman
Attorney Patented Feb. 18, 1936

2,030,866

UNITED STATES PATENT OFFICE 2,030,866

CLOSED CAR WIND DEFLECTOR

Elmer M. Harris, San Diego, Calif.

Application March 6, 1933, Serial No. 659,653

8 Claims. (Cl. 296—84)

My invention relates to wind deflectors for closed cars, and the objects of my invention are:

First, to provide a deflector of this class wherein the deflecting wing is positioned rearwardly of the front edge of the car window in which it is mounted so that the deflecting wing is disposed more laterally than forwardly of an occupant and more efficiently deflect the air from him;

Second, to provide a deflector of this class wherein the area between the deflecting wing and the forward side of the car window is covered;

Third, to provide a deflector of this class which may be mounted in the car window without interfering with the glass closure thereof, thus the conventional closure may be raised or lowered in the conventional manner;

Fourth, to provide a deflector of this class which may be shifted so as to direct air into the vehicle if desired, the deflectors thus acting as ventilating louvers;

Fifth, to provide a deflector of this class comprising a pair of wing members mounted so as to swing about a common axis but so arranged that either wing may be shifted without tending to shift the other wing;

Sixth, to provide a deflector of this class which incorporates a novel mounting for a pair of deflector wings so arranged that each deflector wing is shiftable independently of the other, and Seventh, to provide on the whole a novelly constructed wind deflector for closed cars which is easily installed, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a side elevational view of my wind deflector with the marginal portion of a car window shown fragmentarily; Fig. 2 is a sectional view thereof through 2—2 of Fig. 1 also showing the marginal portion of a car window fragmentarily; Fig. 3 is a fragmentary sectional view through 3—3 of Fig. 1; Fig. 4 is an elevational view of one of the key washers, and Fig. 5 is an enlarged fragmentary sectional view through 5—5 of Fig. 1.

Similar characters of reference refer to similar parts and portions throughout the several views of the drawing.

Forward deflector member or panel 1, rear deflector member or deflecting plate 2, bracket members 3 and 4, hinge pins 5, supports 6, lock washers 7, nut members 8, key washers 9, friction washers 10 and sealing strip 11, constitute the principal parts and portions of my wind deflectors for closed cars.

A deflector unit is provided for each side of a car. Each deflector unit comprises a forward deflector member 1 and a rear deflector member 2. The forward deflector 1 is shaped at its forward edge and upper and lower edges so as to conform with the forward and upper and lower margins of a car window designated A, such as the window formed in the front doors of a closed car. The rear edge of the forward deflector member is straight. The rear deflector member is slightly greater in height than the forward deflector but likewise clears the upper and lower margins of the opening in which it is set and its rear edge is curved or otherwise shaped to enhance its appearance. The forward edge of the rear deflector is adapted to project forwardly of the rear edge of the forward deflector member.

The forward deflector member 1 is provided with a pair of bracket members 3 at its upper and lower edges, respectively. Each bracket member 3 comprises a channel shaped portion 3a adapted to fit over the corresponding edge of the deflector. The channel portion 3a is lined with suitable padding 3b so as to assist in gripping the margins of the deflector. The rear extremity of the channel portion 3a terminates in an outwardly directed horizontally disposed ear 3c the extremity of which is substantially circular and provided with a centrally disposed aperture so that the ear 3c forms a hinge element. The hinge elements so formed by the two brackets 3 are in axial alinement and disposed slightly forwardly and outwardly from the rear edge of the forward deflector.

Similarly the rear deflector 2 is provided at its upper and lower margins with bracket members 4, these members having channel portions 4a similar to the channel portions 3a and likewise provided with padding 4b. At their forward extremities the channel portions 4a are provided with ears 4c which extend forwardly and outwardly therefrom and are apertured to form hinge elements adapted to occupy an axis coinciding with the hinge elements 3c.

The bracket members 3 are closer than the brackets 4 so that their hinge element may be disposed axially inwardly with respect to the hinge element 4c. A hinge pin 5 extends through each set of hinge elements. Axially outwardly of each set of hinge elements the corresponding hinge pin is provided with a flange 5a. Axially outwardly of the flange 5a each hinge pin receives a horizontally extending plate 6a of a support 6. Axially outwardly of said plate portion each hinge pin 5 is screw threaded, as indicated by 5b, and receives a lock washer 7 and a nut 8 for rigidly securing the hinge pin to the support 6.

Each support 6 also includes a vertically extending plate portion 6b which joins the plate portion 6a and is provided with apertures through which screws or the like may be extended to secure the support 6 above and below the upper and lower margins of the window opening, as shown best in Fig. 1. The plane of the vertical plate portion 6b is offset outwardly from the planes of the deflector members when parallel therewith so that these members set within the reveal of the window, designated A, but outwardly from the window glass B when the brackets are secured to the side of the window.

In order to ensure independent movement of the two deflectors the shank portion, designated 5c, of each hinge pin extending axially inwardly from the flange 5a is provided with a keyway 5d. Mounted around the shank 5c between the hinge elements 3c and 4d and also axially inwardly of the hinge element 3c are key washers 9 each having a lug 9a extending into its aperture which fits into the keyway 5d. The key washers 9 are suitably spaced from the hinge elements by means of friction washers 10. Axially inwardly of the hinge elements 3c the shank 5c received a lock washer 7 and a second nut 8. With this arrangement either deflector may be shifted without causing the other deflector to move.

The forward deflector 1 is normally positioned in parallel relation with the window glass B of the window opening A and is disposed slightly inwardly from the outer surface of the car body, as shown best in Fig. 2. Secured around the margin of the opening A is a rubber sealing strip 11 which is substantially L-shaped in section with one leg thereof secured to the margin of the opening in any suitable manner and the other leg thereof extending into the opening so as to be engaged by the margin of the forward deflector member, as shown best in Figs. 1 and 2. When the forward deflector is so positioned the rear deflector may be shifted from an angular relation therewith to a parallel disposed relation, as shown by dotted lines in Fig. 2. It should be noted that the proportions are such that the rear deflector as well as the front or forward deflector are entirely outside of the plane of the window glass so that they do not in any manner interfere with the operation thereof.

In order to prevent movement of the rear deflector member across the plane of the window glass B, the ears or hinge elements 4c are provided with lugs 4d which engage the ends of the channel portions 3a when the rear deflector member is in the dotted line position shown in Fig. 2.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. The combination with a vehicle window wherein the window glass is set inwardly from the side of the vehicle body, of a pair of transparent deflector members adapted to fit within said window between the plane of the vehicle body and the window glass, said deflectors disposed one forwardly and outwardly of the other, hinge means for pivotally supporting said deflectors at their adjacent margins, whereby said deflector members may be shifted outwardly beyond the plane of said vehicle body said deflectors being entirely exposed at their overlapping portions to provide uninterrupted vision from one remote margin to the other.

2. The combination with a vehicle window wherein the window glass is set inwardly from the side of the vehicle body, of a pair of transparent deflector members adapted to fit within said window between the plane of the vehicle body and the window glass, said deflectors disposed one forwardly of the other, hinge means for pivotally supporting said deflectors about their adjacent margins, said hinge means being connected with the upper and lower ends only of the deflector whereby said deflector members are entirely exposed at their adjacent portions to provide an uninterrupted vision from one remote margin to the other, and said deflectors may be shifted outwardly beyond the plane of said vehicle body, said hinge means including elements for separating the connections of said deflectors with said hinge means whereby either deflector is pivotable without influencing the position of the other.

3. The combination with a vehicle window wherein the window glass is set inwardly from the side of the vehicle body, of a pair of transparent deflector members adapted to fit within said window between the plane of the vehicle body and the window glass, said deflectors disposed one forwardly of the other, hinge means for pivotally supporting said deflectors at their adjacent margins, said hinge means being connected with the upper and lower ends of the deflector whereby said deflector members are entirely exposed at their adjacent portions to provide an uninterrupted vision from one remote margin to the other, and said deflectors may be shifted outwardly beyond the plane of said vehicle body, and a yieldable sealing strip extending between the margins of the forward deflector and the vehicle window when said deflector is in parallel disposed relation with the window glass, whereby said forward deflector forms a sealed panel.

4. The combination with a vehicle window wherein the window glass is set inwardly from the side of the vehicle body, of a hinge means disposed above and below the vehicle window defining an axis disposed rearwardly from the forward margin of the vehicle window, a pair of transparent deflectors pivotally supported from said hinge means and when in parallel disposed relation adapted to extend in opposite directions and occupying offset planes and overlapping at their adjacent margins, both of said deflectors adapted to set within the vehicle window between the plane of the window glass and the plane of the vehicle body, one of said deflectors enclosing the area of said vehicle window forwardly of said hinge means, the other of said deflectors arranged to shift from a plane between said window glass and forward deflector into angular disposed relation therewith said deflectors being entirely unobstructed at their adjacent margins to provide uninterrupted vision from one remote margin to the other.

5. In a wind deflector for vehicle windows a pair of deflector members in the form of planes of transparent material, both positioned in vertical overlapped relation in a single window opening, clamp means engaging each deflector by its upper and lower margins only, hinge elements associated with each clamp means, a common support for each set of hinge elements securable to the upper and lower margins of the window, and means for independently journalling the hinge elements on said support whereby each deflector is shiftable independently of the other, each pair of hinge elements disposed opposite an edge of its deflector and arranged on said support to direct the deflectors in opposite direction.

6. The combination with a vehicle window wherein the window glass is set inwardly from the side of the vehicle body, of a pair of deflectors each in the form of a plane sheet of transparent material, support and journal means engageable with the upper and lower margins only of said deflectors and supported from the upper and lower margins of the vehicle window, said means having a common axis disposed outwardly from the window and arranged to support the deflectors in offset planes both within the space between the exterior side of the vehicle body and the window glass carried thereby.

7. The combination with a vehicle window wherein the window glass is set inwardly from the side of the vehicle body, of a pair of deflectors each in the form of a plane sheet of transparent material, support and journal means engageable with the upper and lower margins only of said deflectors and supported from the upper and lower margins of the vehicle window, said means having a common axis disposed outwardly from the window and arranged to support the deflectors in offset planes both within the space between the exterior side of the vehicle body and the window glass carried thereby, said support and journal means disposed rearwardly of the forward vertical edge of the window and one of said deflectors extending from the support and journal means forwardly and arranged with its margins to conform to the corresponding margins of the window, and a flexible sealing strip disposed between the edge of the forward deflector and the margin of the vehicle window.

8. In a wind deflector for a vehicle window having an exterior reveal, a panel disposed within the reveal of the window closing the forward portion thereof, and a wind deflecting plate pivotally disposed rearwardly of said panel and overlapping the back portion of said front panel, said panel and plate both being entirely transparent at their adjacent overlapped margins.

ELMER M. HARRIS.